United States Patent
Chen et al.

(10) Patent No.: US 9,879,721 B2
(45) Date of Patent: Jan. 30, 2018

(54) SLIDE RAIL ASSEMBLY AND SLIDING ASSISTANCE DEVICE THEREOF

(71) Applicants: KING SLIDE WORKS CO., LTD., Kaohsiung City (TW); KING SLIDE TECHNOLOGY CO., LTD., Kaohsiung City (TW)

(72) Inventors: Ken-Ching Chen, Kaohsiung (TW); Shih-Lung Huang, Kaohsiung (TW); Yi-Syuan Jhao, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 0 days.

(21) Appl. No.: 15/229,283

(22) Filed: Aug. 5, 2016

(65) Prior Publication Data
US 2017/0130770 A1    May 11, 2017

(30) Foreign Application Priority Data

Nov. 11, 2015  (TW) .............................. 104137294 A

(51) Int. Cl.
*F16C 29/04* (2006.01)
*A47B 88/487* (2017.01)
*F16C 33/38* (2006.01)

(52) U.S. Cl.
CPC .......... *F16C 29/043* (2013.01); *A47B 88/487* (2017.01); *F16C 33/3856* (2013.01); *A47B 2210/0097* (2013.01); *F16C 29/048* (2013.01); *F16C 2314/72* (2013.01)

(58) Field of Classification Search
CPC ... A47B 88/477; A47B 88/487; A47B 88/493; F16C 29/04; F16C 29/043; F16C 29/048; F16C 33/3856; F16C 33/4823; F16C 2314/72
See application file for complete search history.

(56) References Cited

U.S. PATENT DOCUMENTS

| | | | |
|---|---|---|---|
| 5,181,781 A | 1/1993 | Wojcik | |
| 6,220,683 B1* | 4/2001 | Chu | A47B 88/487 312/334.11 |
| 6,382,751 B1* | 5/2002 | Chiu | A47B 88/487 312/334.11 |
| 7,213,896 B2 | 5/2007 | Chi | |

(Continued)

FOREIGN PATENT DOCUMENTS

| | | |
|---|---|---|
| CN | 204132846 U | 2/2015 |
| JP | 6-79627 | 11/1994 |

(Continued)

*Primary Examiner* — Phillip A Johnson
(74) *Attorney, Agent, or Firm* — Rosenberg, Klein & Lee

(57) ABSTRACT

A sliding assistance device includes a base and at least one sliding assistance member mounted at the base. The base includes an end portion and a flexible portion bent from the end portion. A space is defined between the flexible portion and the end portion. One of the flexible portion and the end portion has a protruding section. The flexible portion and the end portion are configured to contact each other through the protruding section according to the space when a force is applied to the flexible portion of the base.

7 Claims, 5 Drawing Sheets

(56) References Cited

U.S. PATENT DOCUMENTS

| 8,376,481 B2* | 2/2013 | Lee .................. F25D 25/025 |
| | | 312/331 |
| 2004/0130248 A1 | 7/2004 | Chi |
| 2008/0303395 A1 | 12/2008 | Chen et al. |
| 2010/0045153 A1 | 2/2010 | Ritter |
| 2014/0009054 A1* | 1/2014 | Salice .................. A47B 88/16 |
| | | 312/334.44 |

FOREIGN PATENT DOCUMENTS

| TW | M430204 U1 | 6/2012 |
| TW | 201231319 A1 | 8/2012 |
| WO | 2004063578 A2 | 7/2004 |

\* cited by examiner

SLIDE RAIL ASSEMBLY AND SLIDING ASSISTANCE DEVICE THEREOF

FIELD OF THE INVENTION

The present invention relates to a sliding assistance device and more particularly to a sliding assistance device for use with a slide rail assembly.

BACKGROUND OF THE INVENTION

Generally, a slide rail assembly includes at least two rails, which can be moved with respect to each other. To ensure smooth rail movement, it is sometimes required that a sliding assistance device be movably mounted between the rails, wherein the sliding assistance device typically includes bearing balls. For instance, U.S. Pat. No. 7,213,896 B2 discloses a flexible bearing spacer having a plurality of apertures with bearing balls respectively received therein to facilitate relative displacement of two rails. The bearing spacer further has at least one notch in order to be compressible.

SUMMARY OF THE INVENTION

The present invention relates to a sliding assistance device of a slide rail assembly.

According to one aspect of the present invention, a sliding assistance device includes a base and at least one sliding assistance member. The base includes a first end portion and a first flexible portion bent from the first end portion, with a first buffer space defined between the first flexible portion and the first end portion. One of the first flexible portion and the first end portion has a first protruding section. The sliding assistance member is mounted at the base. When the first flexible portion of the base is subjected to a force, the first flexible portion and the first end portion can contact each other through the first protruding section according to the first buffer space.

Preferably, the sliding assistance device is provided for use with a slide rail assembly, wherein the slide rail assembly includes a first rail and a second rail movable with respect to the first rail. The sliding assistance device is arranged between the first rail and the second rail. Moreover, the sliding assistance device in some embodiments includes a plurality of said sliding assistance members. The sliding assistance members are mounted at the base to facilitate movement of the second rail with respect to the first rail. Once the second rail is moved to a predetermined position with respect to the first rail, the base is pressed between the first rail and the second rail, and the first flexible portion and the first end portion can contact each other through the first protruding section according to the first buffer space.

Preferably, the base includes a second end portion opposite the first end portion and a second flexible portion bent from the second end portion, with a second buffer space defined between the second flexible portion and the second end portion. One of the second flexible portion and the second end portion has a second protruding section. The second flexible portion and the second end portion can contact each other through the second protruding section according to the second buffer space.

Preferably, the base includes a third flexible portion bent from the first flexible portion, with a third buffer space defined between the third flexible portion and the first flexible portion. One of the third flexible portion and the first flexible portion has a third protruding section. The third flexible portion and the first flexible portion can contact each other through the third protruding section according to the third buffer space.

Preferably, the base includes a fourth flexible portion bent from the second flexible portion, with a fourth buffer space defined between the fourth flexible portion and the second flexible portion. One of the fourth flexible portion and the second flexible portion has a fourth protruding section. The fourth flexible portion and the second flexible portion can contact each other through the fourth protruding section according to the fourth buffer space.

Preferably, the first end portion has the first protruding section, and the first flexible portion has a lateral surface which can contact the first protruding section of the first end portion according to the first buffer space.

Preferably, the second end portion has the second protruding section, and the second flexible portion has a lateral surface which can contact the second protruding section of the second end portion according to the second buffer space.

According to still another aspect of the present invention, a slide rail assembly includes a first rail, a second rail, and a sliding assistance device. The second rail is movable with respect to the first rail. The sliding assistance device is arranged between the first rail and the second rail and includes a base and a plurality of sliding assistance members. The base includes a first end portion, a second end portion opposite the first end portion, a first flexible portion bent from the first end portion, and a second flexible portion bent from the second end portion. A first buffer space is defined between the first flexible portion and the first end portion, and one of the first flexible portion and the first end portion has a first protruding section. A second buffer space is defined between the second flexible portion and the second end portion, and one of the second flexible portion and the second end portion has a second protruding section. The sliding assistance members are mounted at the base and are in contact between the first rail and the second rail. Once the second rail is moved to a predetermined position with respect to the first rail, the base is pressed between the first rail and the second rail, in which case the first flexible portion and the first end portion can contact each other through the first protruding section according to the first buffer space while the second flexible portion and the second end portion can contact each other through the second protruding section according to the second buffer space.

Preferably, the first rail has a front end, a rear end, and a first position-limiting portion adjacent to the front end of the first rail; and the second rail has a front end, a rear end, and a second position-limiting portion adjacent to the rear end of the second rail. Once the second rail is moved to the predetermined position with respect to the first rail, the base is pressed between the second position-limiting portion of the second rail and the first position-limiting portion of the first rail.

DETAILED DESCRIPTION OF THE INVENTION

Figure 1:
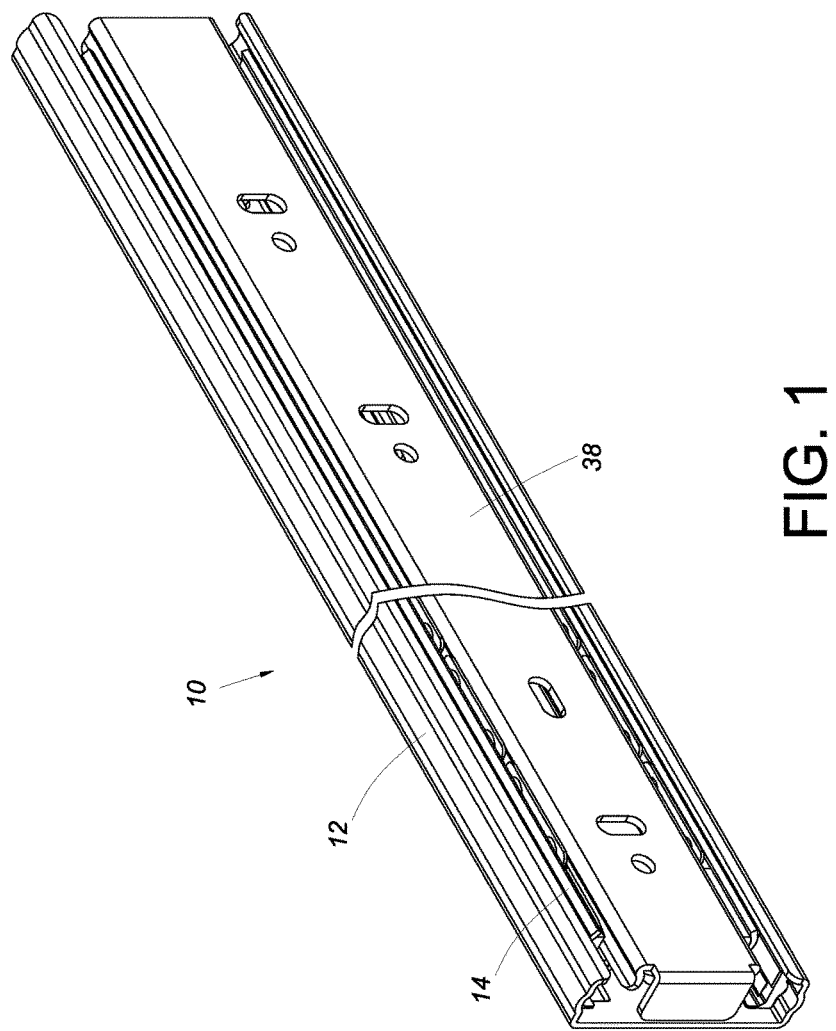
FIG. 1 is a perspective view showing the slide rail assembly in an embodiment of the present invention in the retracted state.
Figure 2:
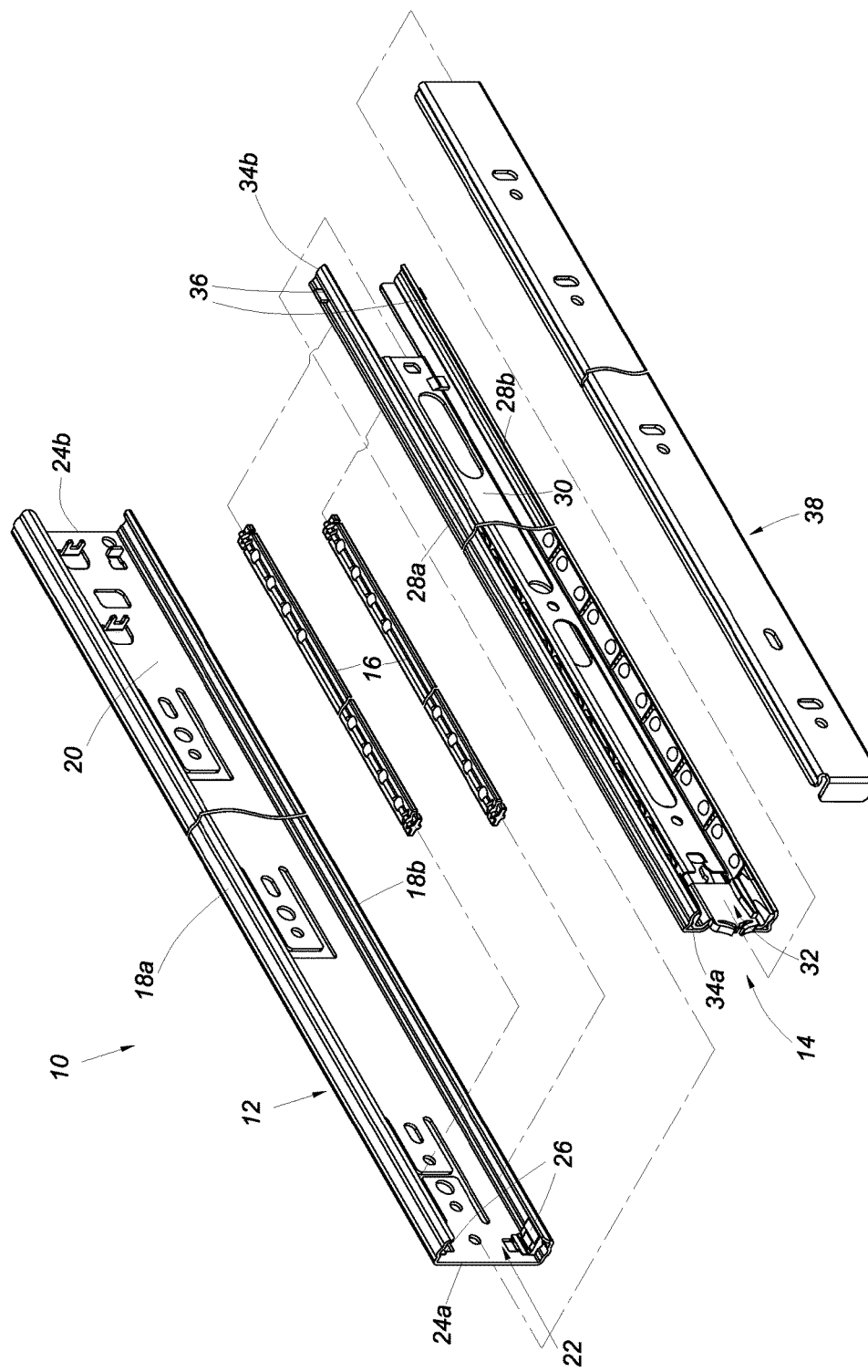
FIG. 2 is an exploded perspective view of the slide rail assembly in FIG. 1.

Referring to FIG. 1 and FIG. 2, the slide rail assembly 10 in an embodiment of the present invention includes a first rail 12, a second rail 14, and at least one sliding assistance device, such as two sliding assistance devices 16. The first rail 12 includes an upper wall 18a, a lower wall 18b, and a longitudinal wall 20 connected between the upper wall 18a and the lower wall 18b. The upper wall 18a, the lower wall 18b, and the longitudinal wall 20 jointly define a first passage 22. The first rail 12 has a front end 24a, a rear end 24b, and at least one first position-limiting portion, such as two first position-limiting portions 26, which are respectively disposed on the upper wall 18a and the lower wall 18b of the first rail 12 and are adjacent to the front end 24a of the first rail 12.

The second rail 14 is received in the first passage 22 of the first rail 12. More specifically, the second rail 14 includes an upper wall 28a, a lower wall 28b, and a longitudinal wall 30 connected between the upper wall 28a and the lower wall 28b. The upper wall 28a, the lower wall 28b, and the longitudinal wall 30 jointly define a second passage 32. The second rail 14 has a front end 34a, a rear end 34b, and at least one second position-limiting portion, such as two second position-limiting portions 36, which are respectively disposed on the upper wall 28a and the lower wall 28b of the second rail 14 and are adjacent to the rear end 34b of the second rail 14.

The two sliding assistance devices 16 are movably arranged between the first rail 12 and the second rail 14. More specifically, each sliding assistance device 16 corresponds to an intermediate position between one first position-limiting portion 26 of the first rail 12 and the corresponding second position-limiting portion 36 of the second rail 14. Both sliding assistance devices 16 are configured to increase the smoothness of movement of the second rail 14 with respect to the first rail 12. Preferably, a third rail 38 is also provided and is received in the second passage 32 of the second rail 14.

Figure 3:
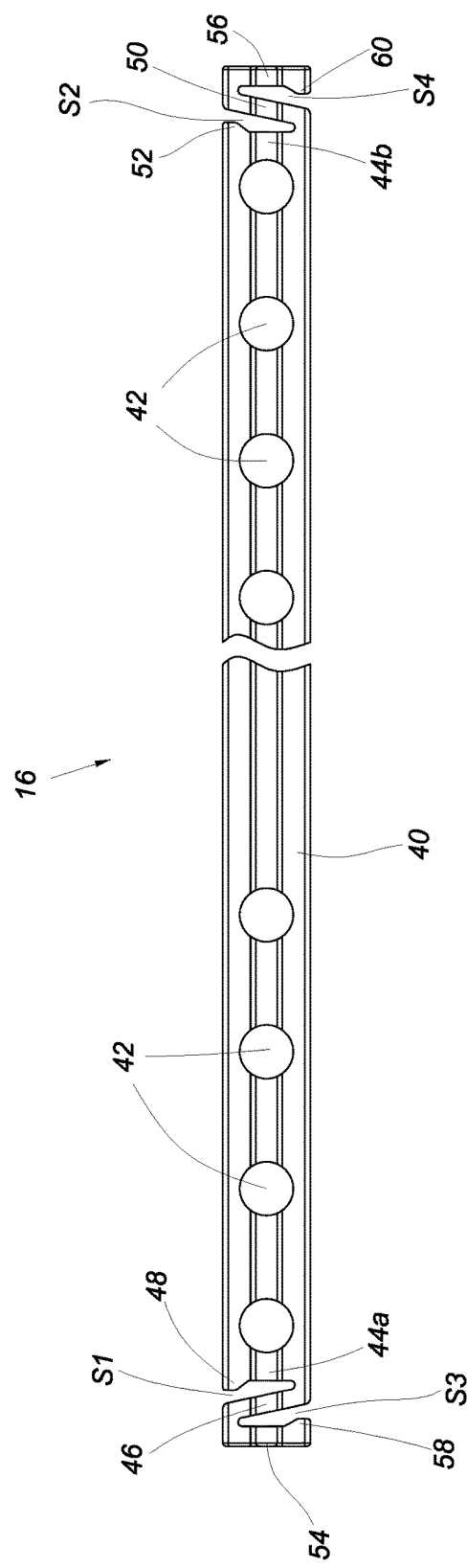
FIG. 3 schematically shows a sliding assistance device in the embodiment of FIG. 1.

As shown in FIG. 3, the sliding assistance device 16 includes a base 40 and a plurality of sliding assistance members 42. The base 40 includes a first end portion 44a and a second end portion 44b opposite the first end portion 44a. More specifically, the base 40 further includes a first flexible portion 46 bent from the first end portion 44a, and a first buffer space S1 is defined between the first flexible portion 46 and the first end portion 44a. One of the first flexible portion 46 and the first end portion 44a has a first protruding section 48. In this embodiment, and by way of example, it is the first end portion 44a that has the first protruding section 48. The first protruding section 48 is shown extending a certain distance from the first end portion 44a toward the first flexible portion 46 in a longitudinal direction but is not necessarily so. In an embodiment which is not shown, it is the first flexible portion that has the first protruding section, and the first protruding section extends a certain distance from the first flexible portion toward the first end portion along the longitudinal direction. Preferably, a second flexible portion 50 is also provided and is bent from the second end portion 44b, and a second buffer space S2 is defined between the second flexible portion 50 and the second end portion 44b. One of the second flexible portion 50 and the second end portion 44b has a second protruding section 52. In this embodiment, and by of example, it is the second end portion 44b that has the second protruding section 52. The second protruding section 52 is shown extending a certain distance from the second end portion 44b toward the second flexible portion 50 along the longitudinal direction but is not necessarily so. In an embodiment which is not shown, it is the second flexible portion that has the second protruding section, and the second protruding section extends a certain distance from the second flexible portion toward the second end portion along the longitudinal direction.

Also provided are a third flexible portion 54 and a fourth flexible portion 56. The third flexible portion 54 is bent from the first flexible portion 46, with a third buffer space S3 defined between the third flexible portion 54 and the first flexible portion 46. One of the third flexible portion 54 and the first flexible portion 46 has a third protruding section 58. In this embodiment, and by way of example, it is the third flexible portion 54 that has the third protruding section 58. The third protruding section 58 is shown extending a certain distance from the third flexible portion 54 toward the first flexible portion 46 along the longitudinal direction but is not necessarily so. In an embodiment which is not shown, it is the first flexible portion that has the third protruding section, and the third protruding section extends a certain distance from the first flexible portion toward the third flexible portion along the longitudinal direction. The fourth flexible portion 56, on the other hand, is bent from the second flexible portion 50, with a fourth buffer space S4 defined between the fourth flexible portion 56 and the second flexible portion 50. One of the fourth flexible portion 56 and the second flexible portion 50 has a fourth protruding section 60. In this embodiment, and by way of example, it is the fourth flexible portion 56 that has the fourth protruding section 60. The fourth protruding section 60 is shown extending a certain distance from the fourth flexible portion 56 toward the second flexible portion 50 along the longitudinal direction but is not necessarily so. In an embodiment which is not shown, it is the second flexible portion that has the fourth protruding section, and the fourth protruding section extends a certain distance from the second flexible portion toward the fourth flexible portion along the longitudinal direction.

The plural sliding assistance members 42 are mounted at the base 40. More specifically, the sliding assistance members 42 are mounted linearly along the base 40, with a spacing between each two adjacent sliding assistance members 42, and are located between the first end portion 44a and the second end portion 44b of the base 40. The sliding assistance members 42 may be balls, wheels, or like elements.

Figure 4:
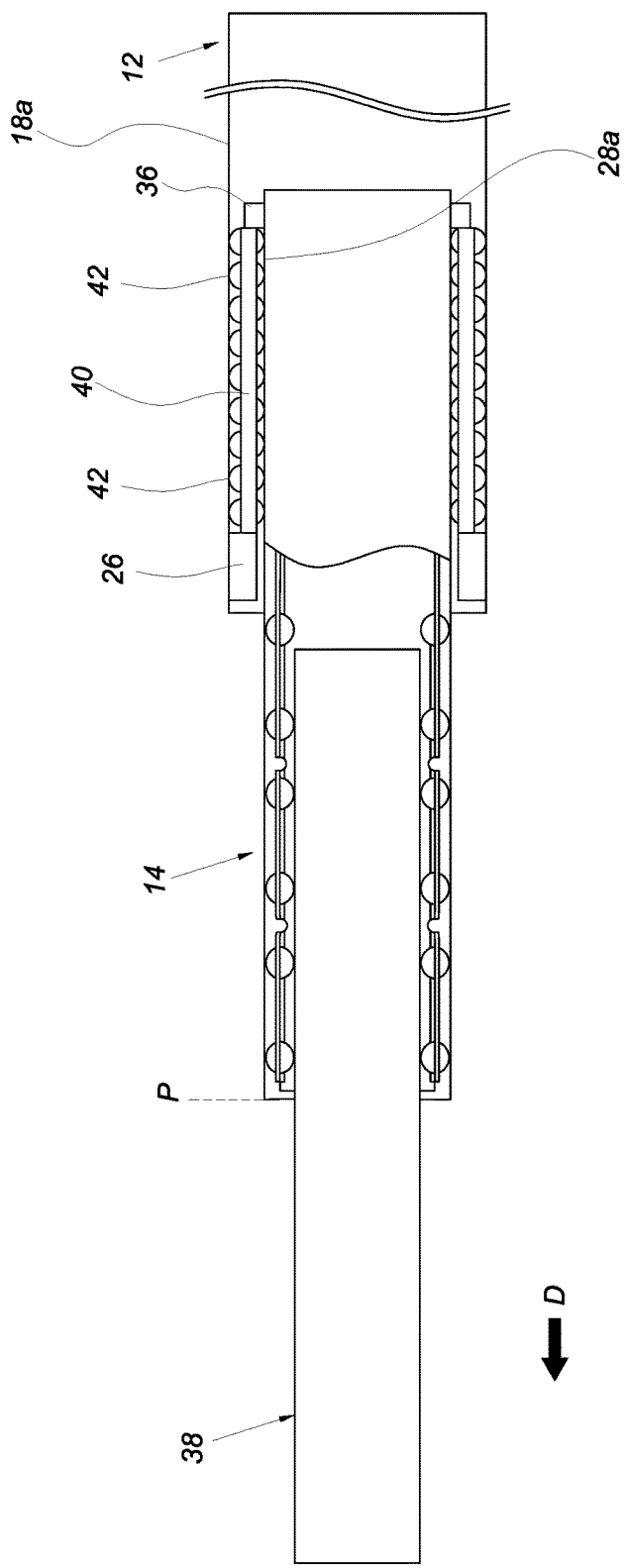
FIG. 4 schematically shows the slide rail assembly in FIG. 1 in an extended state.

Referring to FIG. 4, the sliding assistance members 42 of each sliding assistance device 16 are in contact between the first rail 12 and the second rail 14, e.g., between the upper wall 18a of the first rail 12 and the upper wall 28a of the second rail 14. The sliding assistance members 42 are configured to facilitate movement of the second rail 14 with respect to the first rail 12. The base 40 of each sliding assistance device 16 can be pressed between the first rail 12 and the second rail 14 while the second rail 14 and the third rail 38 are being moved in a direction D from a retracted state (see FIG. 1) with respect to the first rail 12 to an extended state. More specifically, when the second rail 14 reaches a predetermined position P with respect to the first rail 12, the base 40 of each sliding assistance device 16 is pressed between the corresponding second position-limiting portion 36 of the second rail 14 and the corresponding first position-limiting portion 26 of the first rail 12.

Figure 5:
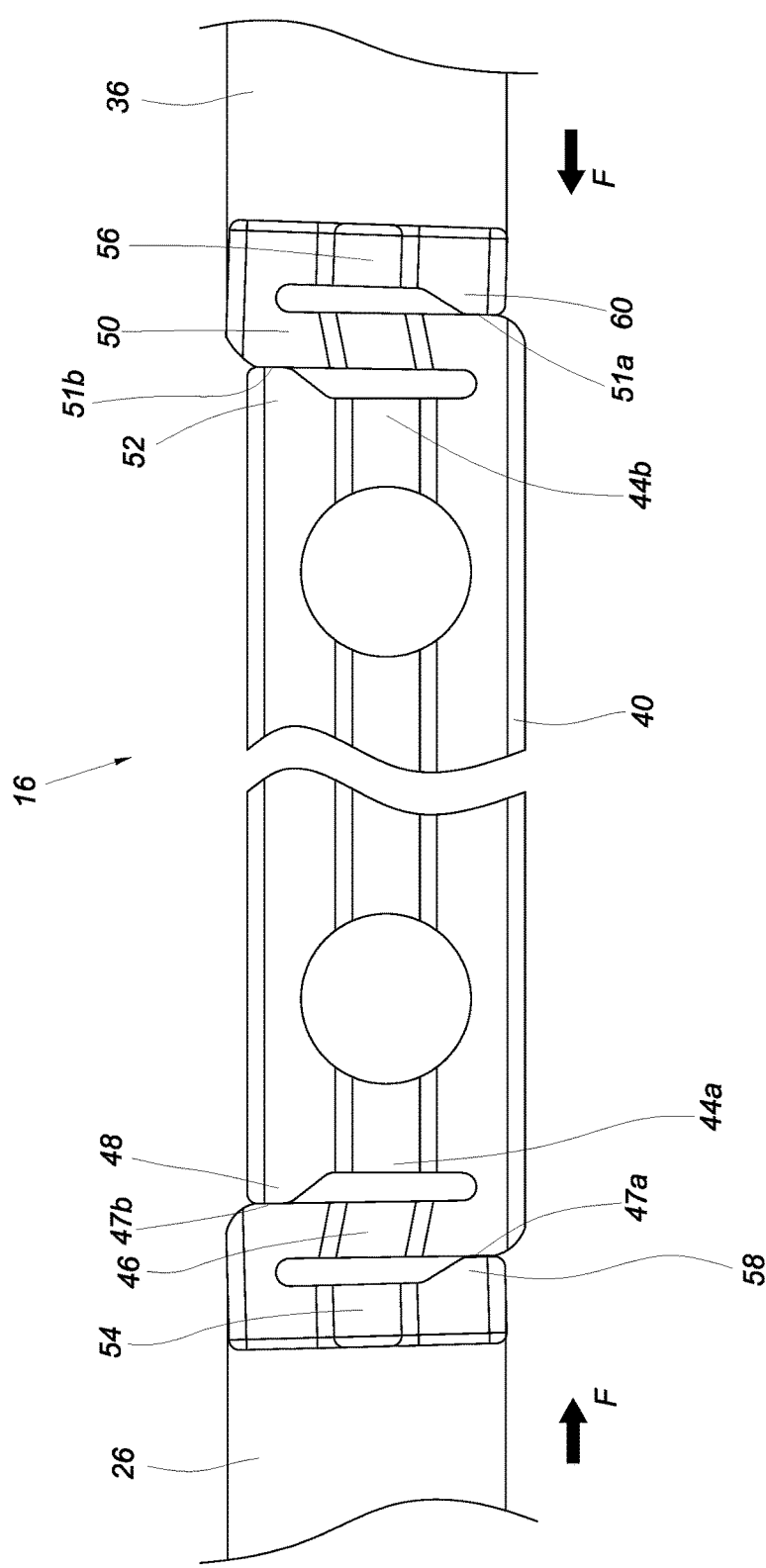
FIG. 5 schematically shows how the base of the sliding assistance device in FIG. 3 produces a buffering effect.

Referring to FIG. 5 in conjunction with FIG. 3 and FIG. 4, once the second rail 14 reaches the predetermined position P with respect to the first rail 12, the base 40 is pressed between the corresponding second position-limiting portion 36 and the corresponding first position-limiting portion 26. In other words, two portions of the base 40, e.g., the third flexible portion 54 and the fourth flexible portion 56, are compressed by a force F and thus produce a buffering effect. More specifically, the third flexible portion 54 and the first flexible portion 46 can contact each other via the third protruding section 58 according to the third buffer space S3 when compressed by the force F. For example, the first flexible portion 46 has a first lateral surface 47a, and the third protruding section 58 of the third flexible portion 54 may contact the first lateral surface 47a of the first flexible portion 46. As the first flexible portion 46 is also subjected to the force F and therefore displaced toward the first end portion 44a, the first flexible portion 46 and the first end portion 44a can contact each other via the first protruding section 48 according to the first buffer space S1. For example, the first flexible portion 46 has a second lateral surface 47b, which may contact the first protruding section 48 of the first end portion 44a to produce a buffering effect adjacent to the first end portion 44a of the base 40. Thanks to the third protruding section 58, the portion joining the third flexible portion 54 and the first flexible portion 46 is protected from damage which may otherwise occur if this joining portion is excessively bent during the buffering process. Similarly, thanks to the first protruding section 48, the portion joining the first flexible portion 46 and the first end portion 44a is kept from damage which may otherwise occur if this joining portion is unduly bent during the buffering process.

On the other hand, the fourth flexible portion 56 and the second flexible portion 50 can contact each other via the fourth protruding section 60 according to the fourth buffer space S4 when compressed by the force F. For example, the second flexible portion 50 has a first lateral surface 51a, and the fourth protruding section 60 of the fourth flexible portion 56 may contact the first lateral surface 51a of the second flexible portion 50. As the second flexible portion 50 is also subjected to the force F and therefore displaced toward the second end portion 44b, the second flexible portion 50 and the second end portion 44b can contact each other via the second protruding section 52 according to the second buffer space S1. For example, the second flexible portion 50 has a second lateral surface 51b, which may contact the second protruding section 52 of the second end portion 44b to produce a buffering effect adjacent to the second end portion 44b of the base 40. Thanks to the fourth protruding section 60, the portion joining the fourth flexible portion 56 and the second flexible portion 50 is protected from damage which may otherwise occur if this joining portion is excessively bent during the buffering process. Similarly, thanks to the second protruding section 52, the portion joining the second flexible portion 50 and the second end portion 44b is kept from damage which may otherwise occur if this joining portion is unduly bent during the buffering process.

While the present invention has been disclosed by way of the preferred embodiment described above, it is understood that the embodiment is not restrictive of the scope of the invention. The scope of patent protection sought by the applicant is defined by the appended claims.

What is claimed is:

1. A sliding assistance device applicable to a slide rail assembly, wherein the slide rail assembly comprises a first rail and a second rail movable with respect to the first rail, the sliding assistance device being arranged between the first rail and the second rail, the sliding assistance device comprising:
   a base, the base including:
      a first end portion and a first flexible portion bent from the first end portion, wherein a first buffer space is defined between the first flexible portion and the first end portion, and one of the first flexible portion and the first end portion has a first protruding section;
      a second end portion opposite the first end portion and a second flexible portion bent from the second end portion, wherein a second buffer space is defined between the second flexible portion and the second end portion, one of the second flexible portion and the second end portion has a second protruding section, and once the second rail is moved to the predetermined position with respect to the first rail, the second flexible portion and the second end portion are configured to contact each other through the second protruding section according to the second buffer space; and
      a third flexible portion bent from the first flexible portion, wherein a third buffer space is defined between the third flexible portion and the first flexible portion, one of the third flexible portion and the first flexible portion has a third protruding section, and the third flexible portion and the first flexible portion are configured to contact each other through the third protruding section according to the third buffer space; and
   a plurality of sliding assistance members mounted at the base to facilitate movement of the second rail with respect to the first rail;
   wherein once the second rail is moved to a predetermined position with respect to the first rail, the base is pressed between the first rail and the second rail, and the first flexible portion and the first end portion are configured to contact each other through the first protruding section according to the first buffer space.

2. A sliding assistance device applicable to a slide rail assembly, wherein the slide rail assembly comprises a first rail and a second rail movable with respect to the first rail, the sliding assistance device being arranged between the first rail and the second rail, the sliding assistance device comprising:
   a base, the base including:
      a first end portion and a first flexible portion bent from the first end portion, wherein a first buffer space is defined between the first flexible portion and the first end portion, and one of the first flexible portion and the first end portion has a first protruding section;
      a second end portion opposite the first end portion and a second flexible portion bent from the second end portion, wherein a second buffer space is defined between the second flexible portion and the second end portion, one of the second flexible portion and the second end portion has a second protruding section, and once the second rail is moved to the predetermined position with respect to the first rail, the second flexible portion and the second end portion are configured to contact each other through the second protruding section according to the second buffer space; and a further flexible portion bent from the second flexible portion; a further buffer space is defined between the further flexible portion and the second flexible portion; one of the further flexible portion and the second flexible portion has a further protruding section; and the further flexible portion and the second flexible portion are configured to contact each other through the further protruding section according to the further buffer space.

3. A sliding assistance device, comprising:
a base, the base including:
    a first end portion and a first flexible portion bent from the first end portion, wherein a first buffer space is defined between the first flexible portion and the first end portion, and one of the first flexible portion and the first end portion has a first protruding section;
    a second end portion opposite the first end portion and a second flexible portion bent from the second end portion, wherein a second buffer space is defined between the second flexible portion and the second end portion, one of the second flexible portion and the second end portion has a second protruding section, and once the second rail is moved to the predetermined position with respect to the first rail, the second flexible portion and the second end portion are configured to contact each other through the second protruding section according to the second buffer space; and
    a third flexible portion bent from the first flexible portion, wherein a third buffer space is defined between the third flexible portion and the first flexible portion, one of the third flexible portion and the first flexible portion has a third protruding section, and the third flexible portion and the first flexible portion are configured to contact each other through the third protruding section according to the third buffer space; and
at least one sliding assistance member mounted at the base;
wherein when the first flexible portion of the base is subjected to a force, the first flexible portion and the first end portion are configured to contact each other through the first protruding section according to the first buffer space.

4. The sliding assistance device of claim 3, wherein the first end portion has the first protruding section, the first flexible portion has a lateral surface, and the lateral surface of the first flexible portion is configured to contact the first protruding section of the first end portion according to the first buffer space.

5. The sliding assistance device of claim 3,
wherein the second end portion has the second protruding section, the second flexible portion has a lateral surface, and the lateral surface of the second flexible portion is configured to contact the second protruding section of the second end portion according to the second buffer space.

6. A slide rail assembly, comprising:
a first rail;
a second rail movable with respect to the first rail; and
a sliding assistance device arranged between the first rail and the second rail, the sliding assistance device including:
    a base, the base including:
        a first end portion, a second end portion opposite the first end portion, a first flexible portion bent from the first end portion, and a second flexible portion bent from the second end portion, wherein a first buffer space is defined between the first flexible portion and the first end portion, one of the first flexible portion and the first end portion has a first protruding section, a second buffer space is defined between the second flexible portion and the second end portion, and one of the second flexible portion and the second end portion has a second protruding section;
        a second end portion opposite the first end portion and a second flexible portion bent from the second end portion, wherein a second buffer space is defined between the second flexible portion and the second end portion, one of the second flexible portion and the second end portion has a second protruding section, and once the second rail is moved to the predetermined position with respect to the first rail, the second flexible portion and the second end portion are configured to contact each other through the second protruding section according to the second buffer space; and
        a third flexible portion bent from the first flexible portion, wherein a third buffer space is defined between the third flexible portion and the first flexible portion, one of the third flexible portion and the first flexible portion has a third protruding section, and the third flexible portion and the first flexible portion are configured to contact each other through the third protruding section according to the third buffer space; and
    a plurality of sliding assistance members mounted at the base and being in contact between the first rail and the second rail;
wherein once the second rail is moved to a predetermined position with respect to the first rail, the base is pressed between the first rail and the second rail, the first flexible portion and the first end portion are configured to contact each other through the first protruding section according to the first buffer space, and the second flexible portion and the second end portion are configured to contact each other through the second protruding section according to the second buffer space.

7. The slide rail assembly of claim 6, wherein the first rail has a front end, a rear end, and a first position-limiting portion adjacent to the front end of the first rail; the second rail has a front end, a rear end, and a second position-limiting portion adjacent to the rear end of the second rail; and once the second rail is moved to the predetermined position with respect to the first rail, the base is pressed between the second position-limiting portion of the second rail and the first position-limiting portion of the first rail.

* * * * *